United States Patent
Baumgartner

(10) Patent No.: US 6,507,760 B1
(45) Date of Patent: Jan. 14, 2003

(54) NUMERICAL CONTROL UNIT WITH A SPATIALLY SEPARATED INPUT DEVICE

(75) Inventor: Alfons Baumgartner, Grassau (DE)

(73) Assignee: Johannes Heidenhain GmbH, Traunraut (DE)

(*) Notice: Subject to any disclaimer, the term of this patent is extended or adjusted under 35 U.S.C. 154(b) by 0 days.

(21) Appl. No.: 09/332,813

(22) Filed: Jun. 14, 1999

(30) Foreign Application Priority Data

Jun. 17, 1998 (DE) .......................................... 198 26 875

(51) Int. Cl.⁷ .............................................. G05B 15/00
(52) U.S. Cl. .............................................. 700/2; 700/21
(58) Field of Search .......................... 700/2, 4, 5, 12, 700/17, 21, 67, 79, 81, 82, 169, 83, 249; 714/819, 820

(56) References Cited

U.S. PATENT DOCUMENTS

| | | | | |
|---|---|---|---|---|
| 3,978,327 A | * | 8/1976 | Huber | 714/10 |
| 4,120,093 A | | 10/1978 | Spies | 33/533 |
| 4,280,285 A | * | 7/1981 | Haas | 434/30 |
| 4,330,831 A | | 5/1982 | Schwefel | 700/176 |
| 4,511,975 A | * | 4/1985 | Nozawa et al. | 700/177 |
| 4,618,940 A | * | 10/1986 | Schmitt | 702/94 |
| 4,739,197 A | * | 4/1988 | Schmitt | 327/113 |
| 4,792,910 A | * | 12/1988 | Lange | 358/1.16 |
| 4,928,561 A | * | 5/1990 | Fouche | 82/1.11 |
| 4,998,472 A | * | 3/1991 | Rodi et al. | 101/216 |
| 5,036,455 A | * | 7/1991 | Atwood | 714/22 |
| 5,065,330 A | * | 11/1991 | Karube et al. | 700/166 |
| 5,752,790 A | * | 5/1998 | Szczepanski | 409/2 |
| 5,799,033 A | * | 8/1998 | Baggen | 375/250 |
| 5,915,488 A | * | 6/1999 | Fliege | 180/65.2 |
| 5,956,659 A | * | 9/1999 | Spies et al. | 702/94 |
| 6,061,601 A | * | 5/2000 | Jansen | 700/7 |
| 6,201,997 B1 | * | 3/2001 | Giers | 700/79 |
| 6,269,284 B1 | * | 7/2001 | Lau et al. | 700/193 |

FOREIGN PATENT DOCUMENTS

| | | |
|---|---|---|
| DE | G 82 36 366.8 | 9/1983 |
| DE | 32 25 455 | 1/1984 |
| DE | 43 03 264 | 8/1994 |
| DE | 43 12 305 | 10/1994 |
| DE | 195 04 404 | 6/1996 |
| DE | 195 43 817 | 5/1997 |
| DE | 297 10 026 | 9/1997 |
| EP | 0 742 498 | 11/1996 |
| EP | 0 742 500 | 11/1996 |
| EP | 0 742 505 | 11/1996 |

OTHER PUBLICATIONS

Wray et al., Using Microprocessors and Microcomputers, 1994, Prentice Hall Career & Technology, Third Edition, pp. 209.*

English language abstract of German Reference No. 43 12 305.

English language abstract of European Reference No. 0 742 498.

English language abstract of European Reference No. 0 742 500.

English language abstract of European Reference No. 0 702 505.

(List continued on next page.)

Primary Examiner—Maria N. Von Buhr
Assistant Examiner—Chad Rapp
(74) Attorney, Agent, or Firm—Brinks Hofer Gilson & Lione

(57) ABSTRACT

A method for the dependable operation of a spatially separated input device of a numerical control that includes inputting at an input device so as to generate output signals, supplying the output signals to at least two processors and checking the output signals or signals based on the output signals for conformity in a comparator device. The method further includes transmitting a first shut-off signal to a control unit if there is no conformity.

58 Claims, 2 Drawing Sheets

OTHER PUBLICATIONS

English language abstract of German Reference No. 32 25 455.
English language abstract of German Reference No. 43 03 264.
English language abstract of German Reference No. 195 04 404.
English language abstract of German Reference No. 195 43 817.
English language abstract of German Reference No. 297 10 026.
Bernard Hilpert et al., "Sicherheitsaspekte moderner CNC–Systeme," Elektronik, vol. 4, Feb. 26, 1982, pp. 47–52.
Franz Dernoschek, "Sicherheitsrelevante Rechnersysteme," Elektronik, vol. 26, Dec. 31, 1982, pp. 27–31.
"DIN EN 954," Entwurf, Mar. 1993, cover page and pp. 21 and 23.
Pending Patent Application No. 08/942,909, Inventor: Strasser: Filing Date: Oct. 2, 1997—assigned to Johannes Heidenhain GmbH 602911E.
Pending Patent Application No. 09/047,702, Inventor: Spies et al., Filing Date: Mar. 25, 1997—assigned to Johannes Heidenhain Gmbh 5956659.
Pending Patent Application No. 09/130,952, Inventor: Kerner, Filing Date: Aug. 7, 1998—assigned to Johannes Heidenham GmbH Pat. No. 6127793.

* cited by examiner

NUMERICAL CONTROL UNIT WITH A SPATIALLY SEPARATED INPUT DEVICE

Applicant claims, under 35 U.S.C. §119, the benefit of priority of the filing date of Jun. 17, 1998 of a German patent application, copy attached, Serial Number. 198 26 875.0, filed on the aforementioned date, the entire contents of which is incorporated herein by reference.

BACKGROUND OF THE INVENTION

1. Field of the Invention

The present invention relates to a numerical control unit for machine tools or robots with a spatially separated input device, wherein the input device has at least one input means for user information, and wherein a consent signal is transmitted via a connecting line to the control unit. The invention further relates to a method for operating the numerical control unit.

2. Discussion of Related Art

It is known from German Utility Model G 82 36 366.8, that in addition to a control board, machine tools can have an additional mobile manual advance device for special functions. In most cases, an indicator device is a part of the control board so that the user can trigger and monitor all functions of the control unit of the machine from there. The mobile manual advance device is also called an electronic handwheel and makes it possible for the user to enter, for example, the advance for one or several machine shafts not only when he stands at the control board, but also if he is located at a largely arbitrary position. To make this possible, the mobile manual advance device has several keys, for example, for the selection of a shaft, and an angle encoder for realizing a handwheel. In this case, the connection between the manual advance device and the control unit is provided via a cable having the lines required for signal transmission. This embodiment of a manual advance device has the disadvantage that it has not been designed to tolerate errors.

A numerical control unit with a spatially separated operating device, which has a handwheel for entering setting commands, is known from DE 297 10 026. In this case, the transmission of the setting commands from the spatially separated operating device to the control unit takes place within a fixed time grid by means of a wireless transmission device in accordance with the DECT (Digital European Cordless Telephone) standard. There is no mechanical connection between the control unit and the operating device, for example by means of a cable.

This embodiment has the disadvantage that it can be interfered with particularly ease by the electromagnetic fields present in a machine shop. Therefore, when the operating device is used, there is the permanent danger of a malfunction of the machine, not only because of the failure of electrical components, but additionally also because of interference with the radio transmission.

Accordingly, efforts are increasingly being made for designing the control units of machine tools, including the input devices, to be tolerant of errors. This means that an error must not result in danger to the user or damage to the machine. This is generally achieved in that redundant systems are used, which perform self-checks and, as soon as an error has been discovered, perform an error treatment. As a rule, the machine is stopped for this, so that no movement of the machine components takes place anymore. In addition, an error report is issued in most cases, which identifies the detected error and thereby makes repairs easier.

Various guidelines already exist regarding the demands made on errorproof systems, in particular control units. EN (European Standard) 954-1 establishes that an error-proof Category 3 system does not change to an unsafe operational stage because of a single error, but continues to remain a safe system in spite of the error.

Input units, which are spatially separated from the control board of a control unit of a machine tool, already exist, wherein an emergency shut-off key, keys for selecting a shaft of the machine tool, a handwheel and further input means are provided. Consent keys are additionally provided in order to increase the avoidance of errors. The latter must be actuated simultaneously with the input means of the input device. It is intended to assure by means of the fact that the user is required to operate two keys for triggering a safety-related function, that the user cannot initiate a malfunction or an unsafe operational state of the machine by a single input.

In this connection it is disadvantageous that the user must operate several keys for a simple input. The many connecting lines between the control unit and the input device, which are required for passing on the input signals of the consent keys and other signals, are also disadvantageous.

SUMMARY OF THE INVENTION

It is therefore an object of the present invention to design an input device, which is spatially separated from a control unit, in such a way that a single error does not lead to the unsafe operation of the machine which is controlled by the control unit.

A second object of the present invention is to create a numerical control for machine tools with increased operational dependability and optimized mobile input devices, such as handwheels and keys, in regard to their operational dependability.

A third object of the present invention is that the manipulation of the input device should be as user-friendly as possible, for which reason special consent keys should be omitted.

A fourth object lies in making the input device as cost-effective as possible.

Each of the above objects are attained by one aspect of the present invention that involves a numerical control that includes a control unit and an input device connected to the control unit via a connecting line so as to be spatially separated from the control unit and wherein a consent signal is transmitted from the input device to the control unit via the connecting line. The input device includes an input/output component that generate signals, a first processor connected with the input/output component and a second processor connected with the input/output component and independent from the first processor. The second processor has a comparator device for comparing the generated signals for conformity. A shut-off signal generator is connected with the comparator device and, via connecting lines, with the control unit.

Each of the above objects are attained by a second aspect of the present invention that regards a method for the dependable operation of a spatially separated input device of a numerical control that includes inputting at an input device so as to generate output signals, supplying the output signals to at least two processors and checking the output signals or signals based on the output signals for conformity in a comparator device. The method further includes transmitting a first shut-off signal to a control unit if there is no conformity.

The input device in accordance with the present invention has the advantage that pre-processing of the input signals is performed already in the input device itself. Because of this it is already possible to determine from the input device whether there is a technical malfunction of the keys, switches or of the handwheel and, in case of a malfunction, it is possible to forward an appropriate error message to the control unit by means of the input device. Moreover, it is possible by means of this pre- processing by the input device to advantageously reduce the number of connection lines between the input device and the control unit, by means of which easier manipulation and a more cost-effective production result. Because of these measures for error monitoring, special consent keys can be omitted. The regular monitoring of the connection between the input device and the control unit is furthermore advantageous.

Further objects, advantages and details of the invention will become apparent from the ensuing description of an exemplary embodiment in conjunction with the accompanying drawings.

DESCRIPTION OF THE PREFERRED EMBODIMENT

Figure 1:
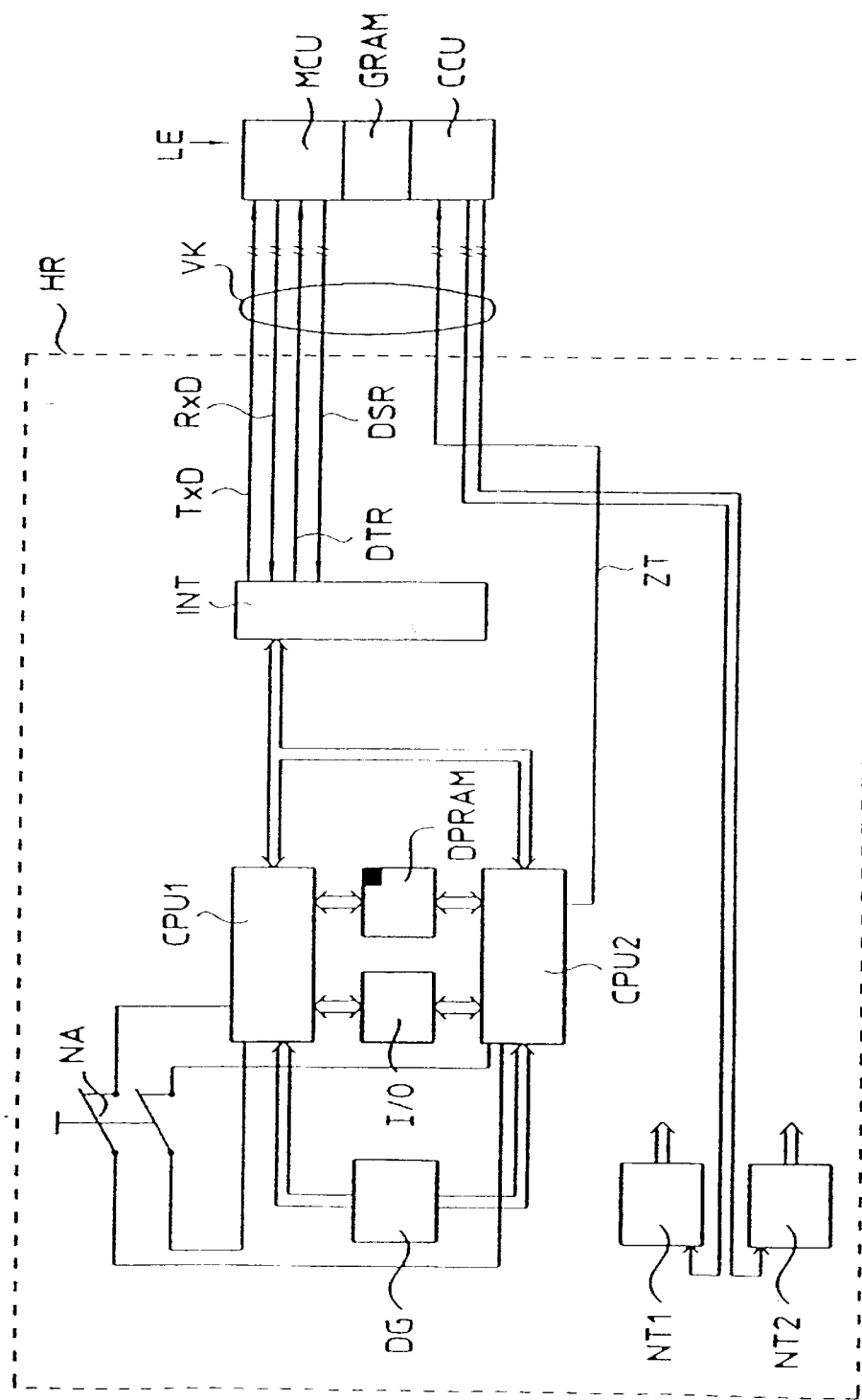
FIG. 1 represents a possible circuit diagram of the input device in accordance with the invention.

FIG. 1 represents the realization of the wiring of the input device HR of a numerical control in accordance with the invention. A first evaluation unit such as processor CPU1 is connected with an angle encoder DG, an emergency shut-off key NA, an input/output component I/O, a dual-port RAM DPRAM and an interface INT. A second evaluation unit such as processor CPU2 that is independent of the first processor CPU1 is furthermore provided which is also connected with the angle encoder DG, the emergency shut-off key NA, the input/output component I/O, the dual-port RAM DPRAM and the interface INT. The interface INT processes output signals from the first and second processors CPU1 and CPU2 for transmission to the control unit LE. In addition, the second processor CPU2 is connected with the control unit LE via a connecting line ZT. At least one power supply unit is furthermore provided, which provides the individual components with the respectively required supply voltage.

This single power supply unit is monitored by the two processors CPU1 and CPU2, which are independent of each other. For increasing the operational reliability it is possible to provide two power supply units NT1 and NT2 in the input device HR, whose primary voltage is supplied from the control unit LE via at least two separate lines, which are independent of each other. It is possible by means of this not only to dependably recognize an error in one power supply unit, but with redundant and unconnected voltage supply to the individual components, an error does not result in the complete loss of the input device HR.

Two keys for two lines are combined in the emergency shut-off key NA, by means of which a redundant realization of the emergency shut-off key NA is achieved. For an alternating cyclic test of the emergency shut-off inputs of the processors CPU1 and CPU2, and of the evaluation components provided for this, the input signal for the one key is made available by the first processor CPU1 and is forwarded to the second processor CPU2 for evaluation. The input signal for the other key is made available by the second processor CPU2 and is forwarded to the first processor CPU1 for evaluation. In this way, with an alternating independent test of a key, its associated lines and evaluation components are checked, while the actuation of the emergency shut-off key NA by the user can continue to be detected by at least one processor.

Two output signals of the angle encoder DG, which are phase-shifted by 90°, are supplied via uncoupling resistors or via analog/digital converters to the two processors CPU1 and CPU2. From the cyclically interrogated output signals of the angle encoder DG, the processors CPU1 and CPU2 determine the values input by the user. It is necessary here to assure that the interrogation of the output signals of the angle encoder DG takes place at a sufficiently high frequency in accordance with the Shannon Scanning Theorem, so that the input actually made by the user can be detected without errors. It is furthermore necessary that the interrogations of the output signals of the angle encoder DG by both processors CPU1 and CPU2 essentially take place at the same frequency, since otherwise the two processors CPU1 and CPU2 will determine different movement values from the output signals of the angle encoder DG.

The interface INT of the input device HR is connected via the connecting lines TxD (terminal data), RxD (receive data), DTR (data terminal ready) and DSR (data set ready) with the spatially separated control unit LE of the numerical control, consisting of MCU (motion control unit) and CCU (current control unit) components as well as the common memory GRAM. As is well known in the art, the TxD connecting line is used for the transmission of data in a first direction while the RxD connecting line is used for the transmission of data in a second direction. It is also well known that the DSR connecting line is used for a synchronization signal for the transmission of data in the first direction while the DSR connecting line is used for a synchronization signal for the transmission of data in the second direction. The connection cable VK contains these lines as well as lines for the voltage supply for the two power supply units NT1 and NT2 and the consent line ZT. Thus, the connecting cable between the control unit LE and the input device HR contains considerably fewer lines than before. The connecting cable VK is advantageously constructed shielded against electromagnetic radiation and protected against mechanical stress.

The input/output component I/O has a number of keys, switches and further input means so that required user inputs can be made. Moreover, this component has optical and/or acoustical signaling means, for example LEDs, a display and/or a voice output, which acknowledge the input to the user or show selected operational states.

During operation, all inputs by the user are passed to the two processors CPU1 and CPU2 for pre-processing, for example via the angle encoder DG, the emergency shut-off key NA and the input/output component I/O. In this case two processors CPU1 and CPU2 are provided which monitor each other. Both processors CPU1 and CPU2 are provided with the same input signals for this purpose, which are pre-processed by both processors CPU1 and CPU2 in such a way that an increased operational dependency is achieved because of the reciprocal monitoring.

Pre-processing consists in that identical digital transmitted data are generated in both processors CPU1 and CPU2 on the basis of identical output signals of the angle encoder DG, the emergency shut-off key NA and the input/output component I/O, which are entered into a defined transmission protocol. The transmitted data generated in this way are issued by one of the two processors CPU1 or CPU2 via the interface INT. Each processor CPU1 and CPU2 has a comparator device integrated therein so that the transmitted data and signals from the other processor are simultaneously read in and compared for conformity with the transmitted data and signals generated by the other processor itself. If in the course of this it is determined that the received transmitted data and signals and those self-generated by the second processor CPU2 are identical, a control signal for continuing the transmission is sent to the first processor CPU1 in that a consent signal is generated and transmitted via the line ZT to the control unit LE. Only after this consent signal has been received are the transmitted data further processed in the control unit LE, for example into reference variables for control circuits.

If a processor should detect a difference between the transmitted data it itself has generated on the basis of identical inputs and those generated by the other processor, a determination is first made whether a tolerable deviation exists. Such a tolerable deviation exists if, for example, the actual values of the output signals of the angle encoder DG determined by the two processors CPU1 and CPU2 have small differences because of slightly different interrogation times, quantization noise and similar influences, which do not affect the operational reliability. In such a case the transmission is maintained in spite of a slight difference, and the consent signal is transmitted by one of the processors to the control unit LE via the line ZT.

However, if there should be an intolerable deviation, a shut-off signal is initiated by one or more shut-off signal generators connected with the comparator devices and integrated in either one or both of the processors CPU1 and CPU2 in that the shut-off signal interrupts the transmission of data which trigger a movement and causes no consent signal is issued by the second processor CPU2 to the control unit LE via the line ZT. Moreover, there is the possibility of detecting this in the control unit LE and to issue an error report to the user.

If now only one processor, for example the second processor CPU2, should detect an intolerable deviation, no consent signal is issued via the line ZT. In this case it is determined in the control unit LE that there is an error in the input device HR, and an error treatment is performed. In this case all shafts of the machine controlled by the control unit LE are stopped and an error report is issued to the user. For achieving a dual-channel error shut-off, the other processor CPU1 is additionally informed of the presence of an error by the second processor CPU2, which has detected the error, via the common memory DPRAM. Then an independent shut-off signal generated by the shut-off signal generator of the first processor CPU1 also signals the presence of an error to the control unit LE via a connecting line separate from the connecting line that sent the error signal from the second processor CPU2 to the control unit LE. If an error should have been detected only by the comparator of the first processor, the data transmission is interrupted by the shut-off signal generator of the first processor CPU1 and an error is signaled to the second processor CPU2 via the common memory DPRAM, whereupon the second processor CPU2 no longer transmits a consent signal to the control unit LE via the line ZT.

Alternatively or additionally to the reciprocal comparison of the transmitted data, the common memory DPRAM of the two processors CPU1 and CPU2 can be used for a comparison of the direct and unchanged output signals from the emergency shut-off key NA, the angle encoder DG and the input/output component I/O in both processors CPU1 and CPU2. In the process, one processor writes the received, direct and unchanged output signals from the emergency shut-off key NA, the angle encoder DG and the input/output component I/O into the common memory DPRAM. The other processor reads these direct and unchanged output signals from the memory DPRAM and compares them with the direct and unchanged output data from such circuit devices as the angle encoder DG, emergency shut-off key NA and the input/output component I/O it itself has received, which during error-free operation must coincide, except for a small tolerance range.

If, taking the tolerance range into consideration, both processors determine the conformity of the output signals, the output signals are transmitted, as already described, via the interface INT and finally after a further comparison of the transmitted data, already described above, to the control unit LE. However, if no conformity between the output signals can be determined, an error treatment is performed, wherein an error report is issued to the user and the drive elements of the machine are stopped by the control unit LE. This is performed as already described in connection with an error-revealing comparison of the transmitted data.

In order to further increase the operational reliability of the input device HR, reciprocal redundant monitoring of the voltage supply/power supply is performed by a voltage monitor integrated into either one or both of the two processors CPU1 and CPU2. If the supply voltage lies outside of defined limits or tolerance, an error treatment is initiated.

A further measure for increasing the operational reliability of the input device HR is achieved by redundant temperature monitoring in connection with temperature-sensitive and safety-related components that is performed by a temperature monitor integrated into either one or both of the two processors CPU 1 and CPU2. If the temperature of the monitored components exceeds an upper threshold value, an error treatment is also triggered.

So that it is possible to also monitor a correct connection between the control unit LE and the input device HR and to detect, for example, a malfunction in the connecting cable VK, the application of various measures for assuring a high transmission reliability between the input device HR and the control unit LE is possible. The direct return transmission of received transmitted data from the receiver to the transmitter is particularly suitable for this, wherein the latter checks the received transmitted data for conformity with the originally transmitted data. For example, in this case transmitted data sent from the input device HR to the control unit LE are received by a first processor MCU of the control unit LE and are forwarded unchanged to the second processor CCU via the common memory GRAM. The second processor CCU passes the transmitted data received in this manner via another memory location of the common memory GRAM back to the first processor MCU of the control unit LE, and the latter passes the transmitted data back to the input device HR.

These returned transmitted data are passed on in the input device via the interface INT to both processors CPU1 and CPU2. These then perform a comparison with the originally sent transmitted data. If the conformity between the originally sent and received transmitted data is detected in the course of this dual-channel comparison, a consent signal is transmitted to the control unit LE via the line ZT. If no conformity is detected, a dual-channel shut-off with an error treatment takes place. Such a return transmission of originally received transmitted data can take place not only from the control unit LE to the input device HR, but also vice versa from the input device HR to the control unit LE.

Alternatively to the return transmission of the complete transmitted data, there is also the possibility of transmitting only one check sum of the transmitted data, which was calculated, for example, in accordance with a CRC algorithm for data security, from the control unit LE back to the input device HR, and to compare it with the originally generated check sum. By means of this it is also possible with a considerably decreased transmission requirement to definitely recognize a transmission error which might lead to an unsafe operational state.

A further possibility for increasing the transmission reliability between the input device and the control unit LE consists in that an error protection code, for example a CRC- or Hamming code, is calculated. The latter is calculated in the input device HR by at least one processor CPU1 and/or CPU2 and added to the transmitted data. In the control unit LE, which received the transmitted data, the error protection code is either newly calculated on the basis of the received transmitted data and checked for conformity by means of the transmitted error protection code, or the transmitted error protection code is decoded and an error in the transmitted data is detected on the basis of this decoding. A single transmission error can also be corrected in case of an appropriately complex error protection code.

The transmission protocol used between the input device HR and the control unit LE is essentially fixed by the interface INT and is suitable for the serial transmission of data. In this case, the transmitted data contain all information which was input by the user via the input means provided at the input device HR, such as emergency shut-off key NA, angle encoder DG and the input/output means I/O. In addition, only the consent signal is transmitted via the line ZT. Because of this it is possible to reduce the number of transmission lines TxD, RxD, DTR, DSR and ZT to a minimum.

It is furthermore also possible by means of the transmission of test signals generated by a test signal generator to check a correct detection of an erroneous transmission between the input device HR and the control unit LE, as well as a correct evaluation. The test signal generator may be integrated in either one or both of the processors CPU1 and CPU2. In this case erroneous data are transmitted back to the input device HR by the control unit LE. Both processors CPU1 and CPU2 then must detect the error independently of each other and transmit appropriate error signals to the control unit LE. The latter expects the error signals within a defined period of time. If the error signals are transmitted from the input device HR to the control unit LE, no error treatment is performed by the control unit LE which has initiated the test. However, if the error signals are not received within the defined period of time by the control unit LE, the control unit LE recognizes an erroneous transmission to the input device HR, or respectively an erroneous evaluation, and an appropriate error treatment is performed.

In order to be able to detect errors in the input device HR as soon as possible, error signals are transmitted which specifically signal an erroneous function of a component. It is necessary in this case to signal to this component that a test will be conducted prior to transmitting a test signal, and that no actual error is present which requires an error treatment. A check is made thereafter whether the error function was detected in the evaluating component.

Further methods and devices are known to one skilled in the art, particularly from communications technology, which can assure an error-free transmission between the input device HR and the control unit LE. These methods from the communications technology can also be used advantageously here for monitoring an error-free transmission.

For example, in a test of the emergency shut-off key NA, the supply voltage for the emergency shut-off key NA is changed by a processor, for example the processor CPU2. The second processor CPU2 simultaneously informs the other processor CPU1 via the common memory DPRAM that a test of the emergency shut-off key NA is being performed. This processor CPU1 thereupon expects an emergency shut-off signal within a fixed period of time. If this emergency shut-off signal occurs within the fixed period of time, it is not passed on to the control unit LE by the processors CPU1, since it is only a test signals and the test was therefore successfully completed. But if the emergency shut-off signal does not appear within the fixed period of time at the input of the second processor CPU1, an error is detected and an appropriate error treatment is performed.

Moreover, it is also known to the processor which does not perform the test, that a test of defined components must be performed by the other processor at defined time intervals. But if this test does not take place, it means that the processor which performs the test must have failed, and an error treatment is performed.

If in the course of the test the user actually actuates the emergency shut-off key NA, this is detected by the other processor CPU2, which had not been provided with a test signal. The processor CPU2 then transmits the emergency shut-off signal to the control unit LE, which performs an error treatment. In the course of the error treatment the entire machine is stopped and an error report issued to the user, which reports the cause for the error treatment.

The test of the emergency shut-off key NA is performed by both processors CPU1 and CPU2, chronologically offset, for both redundant channels of the emergency shut-off key NA, so that a "real" emergency shut-off, initiated by a user during a test, is always performed and can be detected by the other channel of the emergency shut-off key NA.

In this way functional tests of other safety-related components of the input device HR can also take place without the processors MCU and CCU of the control device LE being affected in the process.

Figure 2:
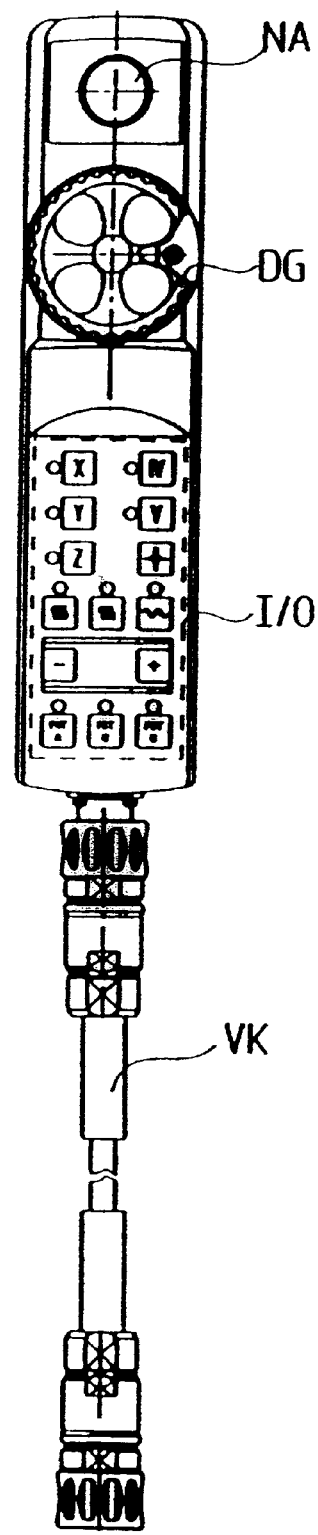
FIG. 2 represents a possible realization of the input device in accordance with the invention.

A possible form of the realization of an input device HR is represented in FIG. 2. This has a handwheel DG, an emergency shut-off key NA, as well as a component I/O with various keys for inputs and LEDs for optical acknowledgement report. The input device HR is connected with the control unit LE via the connection cable VK, which contains the individual transmission lines TxD, RxD, DTR, DSR, ZT etc.

The invention may be embodied in other forms than those specifically disclosed herein without departing from its spirit or essential characteristics. For example, in each of the above described modes and embodiments in the course of an error treatment an error message is issued to the user, which at least specifies the reason for the error treatment, that at least the components of the control and/or of the machine, which are affected by the error, are stopped. The described embodiments are to be considered in all respects only as illustrative and not restrictive, and the scope of the invention is commensurate with the appended claims rather than the foregoing description.

I claim:

1. A numerical control for machine tools or robots comprising:
   a control unit comprising a motion control unit and a current control unit;
   an input device connected to said control unit via a connecting line so as to be spatially separated from said control unit and wherein a consent signal or a shut-off signal is transmitted from input device to said control unit via said connecting line, wherein said input device comprises:
   an input/output component that generate signals;
   a first processor connected with said input/output component so as to receive said generated signals;
   a second processor connected with said input/output component and independent from said first processor, wherein said second processor receives said generated signals and comprises a comparator device for comparing the generated signals for conformity;
   a consent signal generator that generates said consent signal and is connected with said comparator device and, via said connecting line, with said control unit; and
   a shut-off signal generator that generates a signal that results in said shut-off signal and is connected with said comparator device.

2. The numerical control in accordance with claim 1, wherein said input device further comprises an angle encoder.

3. A. The numerical control in accordance with claim 2 wherein said input device further comprises an emergency shut-off key.

4. The numerical control in accordance with claim 3, wherein said input device further comprises keys and switches for user input.

5. The numerical control in accordance with claim 4, wherein said input device comprises an interface which processes output signals of said first processor for transmission to said control unit.

6. The numerical control in accordance with claim 4, wherein said input device comprises an interface which processes output signals of said second processor for transmission to said control unit.

7. The numerical control in accordance with claim 1, wherein said input device further comprises an emergency shut-off key.

8. The numerical control in accordance with claim 1 wherein said input device further comprises keys and switches for user input.

9. The numerical control in accordance with claim 1, wherein said input device comprises an interface which processes output signals of said first processor for transmission to said control unit.

10. The numerical control in accordance with claim 1, wherein said input device comprises an interface which processes output signal of said second processor for transmission to said control unit.

11. The numerical control in accordance with claim 1, characterized in that said shut-off signal generator is integrated into said first processor and said second processor.

12. The numerical control in accordance with claim 1, wherein said input device further comprises a power supply with redundant voltage monitoring.

13. The numerical control in accordance with claim 1, wherein said input device further comprises two independent power supplies which are connected with independent voltage sources via at least two lines.

14. The numerical control in accordance with claim 1, wherein said input device further comprises a voltage monitor.

15. The numerical control in accordance with claim 14, wherein said input device comprises a temperature monitor.

16. The numerical control in accordance with claim 15, wherein said input device comprises a test signal generator.

17. The numerical control in accordance with claim 14, wherein said voltage monitor is integrated into either said first processor or said second processor.

18. The numerical control in accordance with claim 1, wherein said input device comprises a temperature monitor.

19. The numerical control in accordance with claim 18, wherein said temperature monitor is integrated into either said first processor or said second processor.

20. The numerical control in accordance with claim 1, wherein said input device comprises a test signal generator.

21. The numerical control in accordance with claim 20, wherein said test signal generator is integrated into either said first processor or said said second processor.

22. The numerical control in accordance with claim 1, wherein said input device comprises a first analog/digital converter and a second analog/digital converter.

23. The numerical control in accordance with claim 22, wherein said first analog/digital converter is integrated either said first processor or said second processor.

24. The numerical control of claim 1, wherein said input device moves relative to said control unit.

25. A method for the dependable operation of a spatially separated input device of a numerical control for machine tools or robots and said numerical control comprising a control unit that comprises a motion control unit and a current control unit, said method comprising:
   inputting at an input device so as to generate output signals;
   supplying said output signals to at least two processors;
   checking said output signals for conformity in a comparator device;
   transmitting a consent signal to said control unit if there is conformity between said output signals;
   transmitting a first shut-off signal to said control unit if there is no conformity between said output signals.

26. The method of claim 25, wherein said transmitting step comprises transmitting a second shut-off signal, independent of said first shut-off signal, to said control unit if there is no conformity.

27. The method of claim 26, wherein said first and second shut-off signals are transmitted to said control unit via at least two connecting lines.

28. The method of claim 26, wherein said first and second shut-off signals are generated by said at least two processors independently of each other.

29. The method of claim 28, wherein a first one of said output signals need only to conform within a defined tolerance range.

30. The method of claim 28, wherein a first one of said output signals and a second one of said output signals each need only to conform within a defined tolerance range.

31. The method of claim 25, wherein a first one of said output signals need only to conform within a defined tolerance range.

32. The method of claim 25, wherein a first one of said output signals and a second one of said output signals each need only to conform within a defined tolerance range.

33. The method of claim 24, further comprising the step of checking transmission reliability between the input device and the control unit.

34. The method of claim 33, wherein signals transmitted from said input device to said control unit are transmitted back to said input device, that the signals received in this way are checked for conformity in said input device against the originally transmitted signals, and that an error treatment is initiated when there is a lack of conformity.

35. The method of claim 25, wherein circuit devices, which are designed with dual channels, of said input device, as well as their dual-channel evaluation, are cyclically tested, and that initially a first and then a second channel of the circuit devices is tested.

36. The method of claim 37, wherein a test is signaled to the respectively associated evaluation unit to the effect that an input signal of a first channel will be changed, by which an unsafe operating state is signaled to the associated evaluation unit, that a check is made whether the evaluation unit of the first channel detects an unsafe operating state, that subsequently an input signal of a second channel is changed, by which an unsafe operating state is signaled, that a check is made whether the evaluation unit of the second channel detects the unsafe operating state, and that an error treatment is performed if an unsafe operating state had not been detected in the evaluation units of both channels.

37. The method of claim 25, wherein an error protection code is added to the data transmitted from said input device to said control unit.

38. The method of claim 37, wherein an error protection code is added to the data transmitted from said control unit to said input device.

39. The method of claim 37, wherein following the transmission of the data and of the error protection code a check is made by the error protection code whether the data are free of errors, and that in case of a lack of conformity of the transmitted data and the associated error protection code an error treatment is initiated.

40. The method of claim 25, wherein in the course of an error treatment an error message is issued to a user, which at least specifies the reason for the error treatment, that at least the components of the control and/or of a machine, which are affected by the error, are stopped.

41. The method of claim 25, further comprising moving said input device relative to said control unit.

42. A method for the dependable operation of a spatially separated input device of a numerical control for machine tools or robots, said numerical control comprising a control unit that comprises a motion control unit and a current control unit, said method comprising:

inputting at an input device so as to generate output signals;

supplying said output signals to at least two processors;

checking a first signal and a second signal generated in said at least two processors on the basis of said output signals for conformity in a comparator device;

transmitting a consent signal to said control unit if there is conformity between said output signals;

transmitting a first shut-off signal to said control unit if there is no conformity between said first signal and said second signal.

43. The method of claim 42, wherein said transmitting step comprises transmitting a second shut-off signal, independent of said first shut-off signal, to said control unit if there is no conformity.

44. The method of claim 43, wherein said first and second shut-off signals are transmitted to said control unit via at least two connecting lines.

45. The method of claim 43, wherein said first and second shut-off signals are generated by said at least two processors independently of each other.

46. The method of claim 43, wherein said first signal need only to conform within a defined tolerance range.

47. The method of claim 45, wherein said first signal and said second signal each need only to conform within a defined tolerance range.

48. The method of claim 42, wherein said first signal need only to conform within a defined tolerance range.

49. The method of claim 42, wherein said first signal and said second signal each need only to conform within a defined tolerance range.

50. The method of claim 42, further comprising checking transmission reliability between the input device and the control unit.

51. The method of claim 50, wherein signals transmitted from the input device to said control unit are transmitted back to said input device, that the signals received in this way are checked for conformity in said input device against the originally transmitted signals, and that an error treatment is initiated when there is a lack of conformity.

52. The method of claim 42, wherein circuit devices, which are designed with dual channels, of said input device, as well as their dual-channel evaluation, are cyclically tested, and that initially a first and then a second channel of the circuit devices is tested.

53. The method of claim 52, wherein a test is signaled to the respectively associated evaluation unit to the effect that an input signal of a first channel will be changed, by which an unsafe operating state is signaled to the associated evaluation unit, that a check is made whether the evaluation unit of the first channel detects the unsafe operating state, that subsequently an input signal of a second channel is changed, by which an unsafe operating state is signaled, that a check is made whether the evaluation unit of the second channel detects the unsafe operating state, and that an error treatment is performed if an unsafe operating state had not been detected in the evaluation units of both channels.

54. The method of claim 42, wherein an error protection code is added to the data transmitted from said input device to said control unit.

55. The method of claim 54, wherein an error protection code is added to the data transmitted from said control unit to said input device.

56. The method of claim 54, wherein following the transmission of the data and of the error protection code a check is made by the error protection code whether the data are free of errors, and that in case of a lack of conformity of the transmitted data and the associated error protection code an error treatment is initiated.

57. The method of claim 42, wherein in the course of an error treatment an error message is issued to a user, which at least specifies the reason for the error treatment, that at least the components of the control and/or of a machine, which are affected by the error, are stopped.

58. The method of claim 42, further comprising moving said input device relative to said control unit.

* * * * *